UNITED STATES PATENT OFFICE.

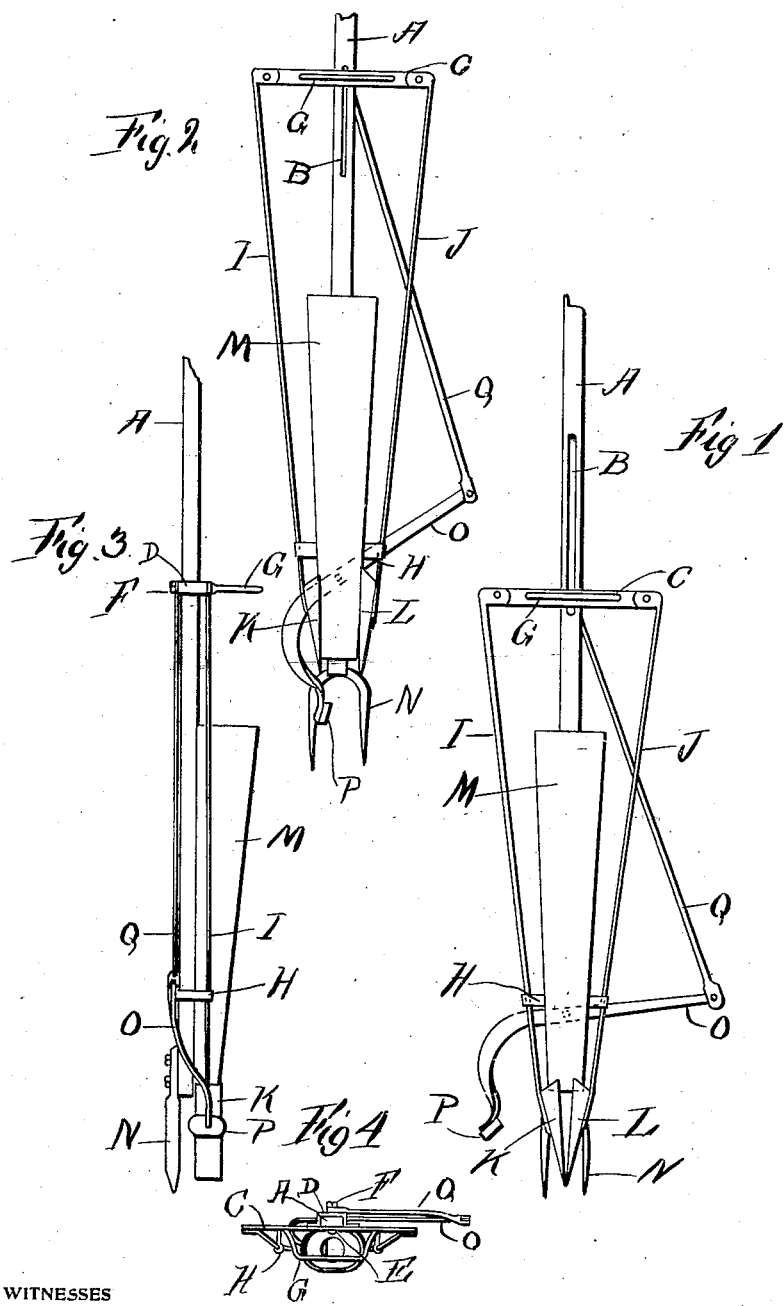

SAMUEL R. HAMMITT, OF NEWFIELD, NEW JERSEY.

PLANTER.

No. 918,041.  Specification of Letters Patent.  Patented April 13, 1909.

Application filed June 20, 1908. Serial No. 439,563.

*To all whom it may concern:*

Be it known that I SAMUEL R. HAMMITT, a citizen of the United States, residing at Newfield, county of Gloucester, and State of New Jersey, have invented a certain new and useful Improvement in Planters, of which the following is a specification.

My invention relates to a new and useful improvement in planters, and has for its object to provide an exceedingly simple and effective device of this character, by means of which plants which are grown beneath sashes or in hot-houses may be reset in the open very quickly and easily.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1, is a front elevation of my improved planter showing the jaws in a closed position. Fig. 2, a similar view, the jaws being opened. Fig. 3, a side elevation thereof, and, Fig. 4, a plan view.

In carrying out my invention as here embodied, A represents a staff or handle having a slot B cut therein.

C indicates a cross bar which is movably secured to the staff or handle A by means of the bracket D which passes around said handle, and is secured to the rear face of the cross bar. Passing through the cross bar C, the slot B, and the bracket D is the bolt E on the end of which is threaded the nut F for keeping it in place, said bolt E acting as a stop in combination with the slot B for the cross bar C. To the front fact of said cross bar C is attached the handle G to enable the operator to lift the cross bar up and down within the limit of the slot B.

H represents a guide bracket secured to the staff or handle A, in proximity to its lower end through which pass the rods I and J, one end of each of which is secured to an end of the cross bar C. To the opposite ends of these rods are attached the jaws K and L, which are triangular in shape, so that their lower ends will form a point when they are closed. The funnel M is fastened to the handle or staff A, so that the lower end thereof extends inside the jaws L, when said jaws are in their closed position. Into this funnel are placed the plants, root downward by the dropper, who walks beside the operator when setting out the plants. On the lower end of the staff or handle A is placed the fork N, which is adapted to stick into the ground for holding the planter steady while it is being manipulated.

The curved packing lever, indicated by the reference letter O, is pivoted on the back of the handle or staff A, and on the lower end thereof is secured the packing block P. To the upper end of the packing lever is pivoted one end of the lever rod Q, the opposite end being held in position to the bracket D which is secured to the cross bar C, by means of the bolt E. When the cross bar C is drawn upward to the position shown in Fig. 2 will open the jaws K and L, through the medium of the guide bracket H, bringing the jaws to the position also shown in Fig. 2 and this movement will also bring the packing lever to the position shown in the same figure.

In practice, the dropper drops the plant root downward into the channel M, which guides said plant into the jaws K and L, when the operator then forces the fork N and the jaws K and L in their closed position into the ground. Now by drawing the cross bar C upward by means of the handle G, it will cause the jaws K and L to open, leaving the roots of the plant in the hole formed by the jaws, and when this cross bar C is drawn upward to its full extent, it will have caused the packing lever O, through the medium of the lever rod Q to pack the dirt about the roots. On account of the weight of the jaws, their connecting rods, the packing lever, and its connecting rod, it will cause the planter to automatically assume the position shown in Fig. 1 after the plant has been placed in the ground.

Of course I do not wish to be limited to the exact details of construction here shown, as these may be varied within certain limits without departing from the spirit of my invention.

Having thus fully described my invention what I claim as new and useful is—

1. In a planter, the combination of a staff having a slot cut therein, a cross bar, a bracket fastened thereto for movably securing the cross bar to the staff, a bolt, passing through the cross bar, the slot in the staff, and the bracket for limiting the movement of the cross bar, a nut threaded on said bolt for holding it in place, a guide bracket attached to the staff, in proximity to its lower end, jaws triangular in shape, rods secured to said jaws, and the ends of the cross bar, passing through the guide bracket, a packing lever curved in shape, pivoted to the back of the staff, a packing block attached to the lower end thereof, a lever rod, one end of which is pivoted to the upper end of the packing lever, the opposite end movably secured to the bracket, which is secured to the cross bar, by means of the bolt which passes therethrough, and a fork attached to the lower end of the staff adapted to penetrate the ground for holding the planter steady, while it is being manipulated.

2. The herein described combination of a staff having a slot formed therein, a cross bar, means for movably securing said cross bar to the staff, a guide bracket attached to the staff, in proximity to its lower end, jaws triangular in shape, rods secured to said jaws, and the ends of the cross bar, passing through the guide bracket, a packing lever curved in shape, pivoted to the back of the staff, a packing block attached to the lower end thereof, a lever rod, one end of which is pivoted to the upper end of the packing lever, the opposite end movably secured to the bracket, and a fork attached to the lower end of the staff, adapted to penetrate the ground, for holding the planter steady, while it is being manipulated.

3. In a planter, a staff having a slot cut therein, a cross bar, means for movably securing said cross bar to the staff, jaws, triangular in shape, rods secured to said jaws and to the cross bar, means for guiding said rods so that the jaws will come together at a certain point, a funnel secured to the staff, a packing lever pivoted to the staff, a packing block secured to the lower end of said lever, means for working said lever, and a fork secured to the lower end of the staff, as specified.

4. In a planter, the combination of a staff having a slot cut therein, a cross bar, a handle secured thereto, means for movably attaching said cross bar to the staff, jaws triangular in shape, rods for connecting said jaws with the cross bar, a guide bracket secured to the staff, through which the rods are adapted to pass, a funnel for guiding the plant into the jaws, means for packing the dirt about the roots of the plant, when the jaws are opened, and means for steadying the planter while being manipulated, as and for the purpose set forth.

5. In combination, a staff, having a slot cut therein, a cross bar movably secured to said staff, jaws, rods for securing said jaws to the cross bar, means for guiding said jaws, means for receiving and guiding the plant to the jaws, a packing lever, means for operating said lever, and a fork adapted to penetrate the ground for steadying the planter, substantially, as and for the purpose set forth.

In testimony whereof, I have hereunto affixed my signature in the presence of two subscribing witnesses.

SAMUEL R. HAMMITT.

Witnesses:
  L. R. MORRELL,
  G. W. MORRELL.